United States Patent [19]
McCormick

[11] Patent Number: 5,349,337
[45] Date of Patent: Sep. 20, 1994

[54] APPARATUS AND METHOD FOR CONTROLLING PECK DRILLING

[75] Inventor: Peter E. McCormick, Dallas, Tex.
[73] Assignee: EOA Systems, Inc., Dallas, Tex.
[21] Appl. No.: 990,501
[22] Filed: Dec. 15, 1992
[51] Int. Cl.⁵ .............................................. G08B 21/00
[52] U.S. Cl. ........................................ 340/680; 408/6
[58] Field of Search ...................... 340/680; 408/6, 16, 408/710; 83/62.1, 72, 76

[56] References Cited
U.S. PATENT DOCUMENTS

| | | | |
|---|---|---|---|
| 4,088,899 | 5/1978 | Miller et al. | 340/680 |
| 4,514,797 | 4/1985 | Begin | 340/680 |
| 4,559,577 | 12/1985 | Shoji et al. | 340/680 |
| 4,697,964 | 10/1987 | Daiko et al. | 408/6 |
| 5,115,473 | 10/1992 | Oketani et al. | 340/680 |

*Primary Examiner*—Glen Swann
*Attorney, Agent, or Firm*—Daniel V. Thompson

[57] ABSTRACT

Peck drilling operations using a drilling tool with a rotatable bit are controlled according to the present invention. A control computer is used to detect various drilling conditions, such as dull or broken bits, transitions between different materials in a workpiece and a breakthrough condition. The control computer continually monitors the thrust and torque applied to the drill bit. A separate feed amp and computer having a preprogrammed feed motion routine for controlling the feeding movement of the drill bit signals the control computer when the bit is in a peck cycle. The control computer is responsive to an indication that the bit is a peck cycle for ignoring the thrust and torque readings during the peck cycle. By determining when the bit is in a peck cycle, the control computer is able to differentiate between a normal peck cycle and other drilling conditions, such as a dull or broken drill bit, transition between materials or breakthrough.

13 Claims, 3 Drawing Sheets

APPARATUS AND METHOD FOR CONTROLLING PECK DRILLING

TECHNICAL FIELD

This invention relates generally to peck drilling and more particularly to improved apparatus and method for controlling peck drilling.

BACKGROUND ART

Peck drilling operations typically require temporary pauses to clear chips and other debris from the drill hole. These periodic pauses are referred to as "peck" cycles. During each peck cycle, feeding of the drill bit into a workpiece is temporarily interrupted at predetermined increments of travel into the workpiece. For example, the feeding operation may be interrupted for 0.1 second every 0.01 inch of travel. Further, the peck cycles may be mixed with full retract cycles, whereby the drill bit is fully retracted from the hole. For example, a retract cycle may be programmed for every 0.1 inch of travel, such that a full retract cycle is programmed for every tenth peck cycle. Full retract cycles are typically used when drilling relatively deep holes in order to avoid chip packing and prevent excessive accumulation of chips in the drill hole.

Sophisticated drilling requires that the drilling apparatus be able to perform a variety of complex peck drilling operations and to automatically detect various conditions, such as dull or broken drill bits, a transition between materials requiring adjustment of the bit feed and rotation rates, and breakthrough when the bit exits the workpiece. According to prior practice, it has not been possible to determine the aforementioned conditions (i.e., dull or broken bits, transition between materials, and breakthrough) during peck drilling because during each peck cycle there is little, if any, thrust or torque on the drill bit. Therefore, because of the rapid decrease in the thrust and torque on the drill bit during each peck cycle, the peck cycle may be mistaken for one of the other conditions (e.g., broken bit or breakthrough).

There is therefore a need in the art of peck drilling to be able to determine when the drill is in a peck cycle in order to distinguish between a peck cycle and other drill bit conditions, such as a broken bit condition or a breakthrough condition.

DISCLOSURE OF THE INVENTION

In accordance with the present invention, apparatus is provided for controlling peck drilling operations using a drill with a rotatable bit. The apparatus is comprised of first motive means for feeding the bit into a workpiece; second motive means for rotating the bit; control means for controlling the first motive means to feed the bit at a predetermined feed rate and the second motive means to rotate the bit at a predetermined rotational rate in accordance with a predetermined set of control parameters; first monitoring means for monitoring thrust applied to the bit and for generating a first electrical signal indicative thereof; and second monitoring means for monitoring torque applied to the bit and for generating a second electrical signal indicative thereof. The control means is operable to ignore the first and second electrical signals when the bit is in a peck cycle, wherein the feeding movement of the bit is temporarily interrupted. The control means is responsive to either or both of the first and second electrical signals when the bit is not in the peck cycle for detecting a predetermined condition. In accordance with a unique feature of the invention, third monitoring means is provided for determining when the drill bit is in a peck cycle.

In one embodiment, the predetermined condition is a broken bit condition indicating a broken drill bit. In accordance with a unique feature of the invention, the broken bit condition is indicated when the measured thrust is less than a predetermined reference thrust and an indication that the bit has not been in a peck cycle within a predetermined period of time. In another embodiment, the predetermined condition is a breakthrough condition indicating that the bit has penetrated completely through the workpiece. In yet another embodiment, the predetermined condition is a dull bit condition indicated when the measured thrust is greater than a predetermined thrust threshold and/or the measured torque is greater than a predetermined torque threshold. In a further embodiment, the predetermined condition is a transition condition indicating that the bit has encountered a transition between discrete materials in the workpiece.

In the preferred embodiment, input means is provided for inputting control parameters into the control means. The control parameters include, but are not limited to, total drill time in the workpiece, elapsed drilling time between transition conditions, the feed rate and rotational speed of the bit in each discrete material, and the maximum thrust force and torque thresholds in each discrete material.

By detecting when the bit is in a peck cycle, the control means is able to differentiate between normally programmed peck cycles and other conditions, such as broken bit, dull bit, thrust transition and breakthrough conditions.

DETAILED DESCRIPTION OF THE PREFERRED EMBODIMENT

Figure 1:
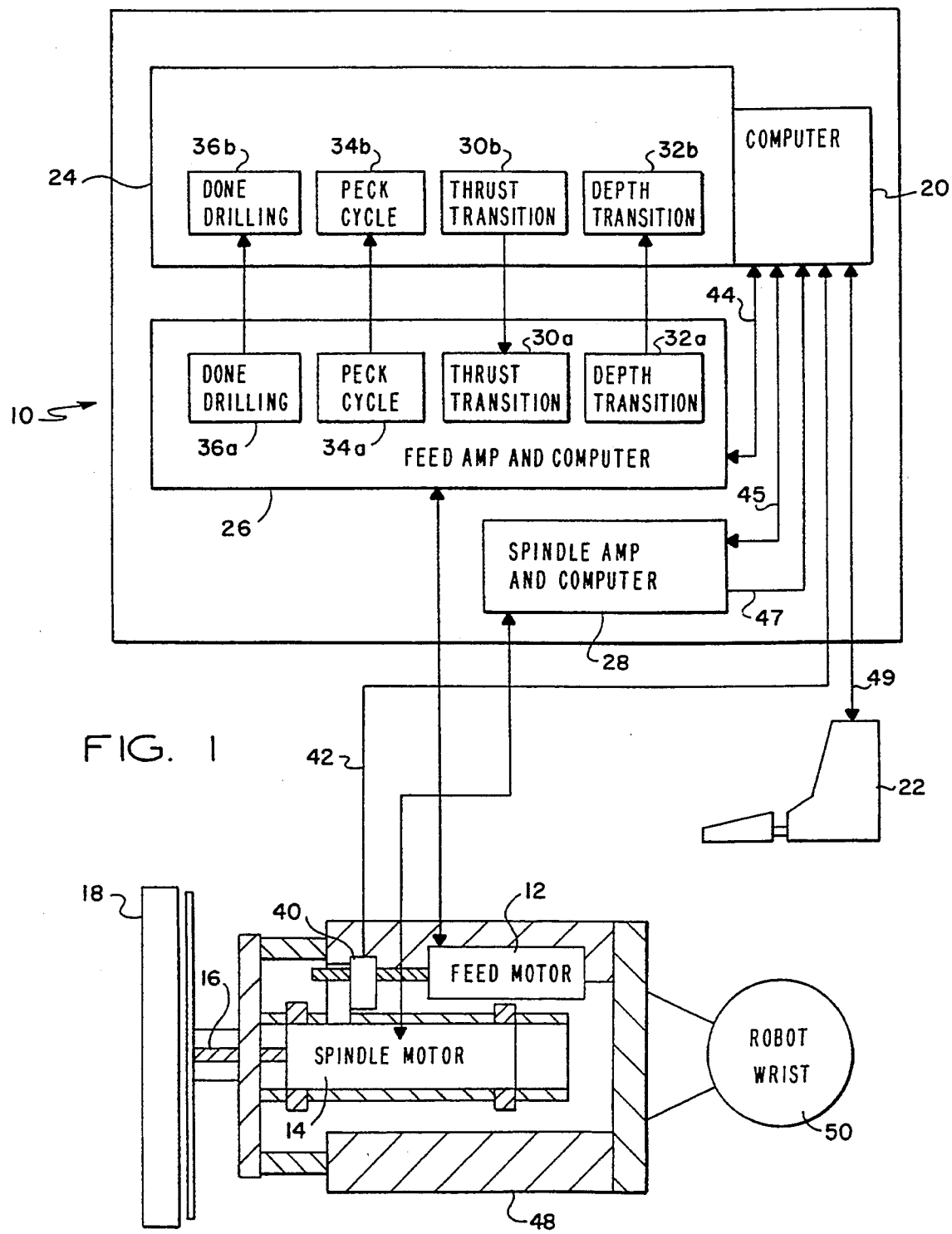
FIG. 1 is a block diagram of apparatus for controlling peck drilling, according to the present invention.

In the description which follows, like parts are marked throughout the specification and drawings with the same respective reference numerals. The drawings are not necessarily to scale and in some instances proportions may have been exaggerated in order to more clearly depict certain features of the invention.

Referring to FIG. 1, apparatus 10 is provided for controlling the operation of a feed motor 12 and a spindle motor 14, which are respectively adapted to feed a drill bit 16 at a predetermined feed rate into a workpiece 18 and to rotate pit 16 at a predetermined rotational rate as bit 16 is fed into workpiece 18. Control apparatus 10 includes a control computer 20, a keyboard and terminal 22 for inputting control parameters into control computer 20, an input/output (I/O) board 24, a feed amplifier and computer 26 and a spindle amplifier and computer 28. Four pairs of optically isolated relays 30a, 30b, 32a, 32b, 34a, 34b and 36a, 36b are also provided. Relays 30a, 30b are used to transmit a control signal from control computer 20 via I/O board 24 to feed amp and computer 26, indicating that a transition between discrete materials in workpiece 18 has been reached, as indicated by a change in the thrust applied to bit 16.

Thrust is measured by a thrust sensor 40, which provides a feedback signal via line 42 to control computer 20. Thrust section 40 is preferably a strain gauge positioned between a feed plate 41 and a ball screw nut (not shown) on feed motor 12. Thrust sensor 40 generates a thrust signal on the order of magnitude of several millivolts. The output signal is amplified to an order of magnitude of several volts. This analog signal is monitored by an analog input module (not shogun), which is read by control computer 20. Thrust is a function of the feed rate of bit 16 and the particular material being drilled. Torque applied to bit 16 is a function of the rotational speed of spindle motor 14 and the particular material being drilled. Torque is measured by monitoring the amplitude of the electrical current supplied to spindle motor 14. Spindle amp and computer 28 generates an analog signal indicative of the drill bit torque. The analog signal is monitored by the analog input which is ready by control computer 20. Both the thrust and torque applied to bit 16 are continually monitored, as will be described in greater detail hereinafter.

Relays 32a, 32b provide a feedback signal from computer 26 to control computer 20 via I/O 24, indicating that bit 16 has penetrated a predetermined depth into workpiece 18 corresponding to a transition between discrete materials. Relays 34a, 34b provide a feedback signal to control computer 20 via I/O 24, indicating that bit 16 is in a peck cycle, whereby the feeding movement of bit 16 into workpiece 18 is temporarily interrupted. Relays 36a, 36b provide a signal from feed amp and computer 26 to control computer 20 via I/O 24, indicating that drilling has been completed and that bit 16 has been retracted completely out of workpiece 18. In addition to communication through relays 30a, 30b, 32a, 32b, 34a, 34b, 36a, 36c and I/O 24, control computer 20 is able to communicate with feed amp and computer 26 via a serial communication line 44. Control computer 20 communicates with spindle amp and computer 28 via communication lines 45 and 47 and with keyboard 22 via communication line 49. Relays 30a, 30b, 32a, 32b, 34a, 34b, 36a and 36b are preferably optoelectronic relays of the 1PC5,0DC5 type, manufactured and sold by Opto-22 and Gordos.

Feed motor 12, spindle motor 14 and bit 16 comprise a drilling tool, which is retained by an adapter 48 configured for attachment to a robot wrist 50 at end of a robot arm (not shown). For example, adapter 48 may be of the type shown and described in U.S. Pat. Re. 32,854. Robot wrist 50 is moveable for manipulating adapter 48 and drilling tool 46.

Selected control parameters are entered into control computer 20 via keyboard and terminal 22 or over an RS-232 interface (not shown) directly from the robot (not shown). For example, the parameters may include the rotational speed of spindle motor 14 (e.g., 1,200 RPM), the feed rate of bit 16 (e.g., 0.014 inch/rotation), the depth of the hole to be drilled in workpiece 18 (e.g., 1.004 inches), the length of the retract stroke of bit 16 during a retract cycle (e.g., 0.04 inch) and a dull bit thrust threshold (e.g., 70 lbs.).

Control computer 20 is programmed by "teaching" a "perfect" drill bit to control computer 20 using the same material and drilling environment that will be used during the actual drilling operation. These "taught" characteristics are used for detecting dull bit, broken bit and drill breakthrough conditions. Two holes are required to "teach" control computer 20. Control computer 20 is software programmable to remember and store the thrust and torque readings of drill bit 16 while the teach holes are being drilled.

The following parameters are programmed into control computer 20 for a plurality of different materials (e.g., materials a, b, c, d) while the first "teach" hole is being drilled:

1. The elapsed drill time (i.e., the total time feed motor 12 feeds bit 16 while drilling, including peck cycles and retract cycles) at each thrust transition depth between different materials (a, b, c, d);
2. The total time to drill the hole, including bit feed and retract times;
3. The maximum thrust and torque are determined to set the dull bit feed threshold and the dull bit torque threshold for each material (a, b, c, d);
4. The thrust transition for each material (a, b, c, d) is set to the maximum thrust in the corresponding material;
5. The broken bit thrust threshold for each material is set to the maximum thrust in the corresponding material (a, b, c, d);
6. The breakthrough threshold is set to 30% of the maximum thrust in the last material (d) in workpiece 18.

The following parameters are set while the second and final "teach" hole is being drilled:

1. The elapsed drill time at each thrust transition depth is stored as a drill time variable, with the old value being overwritten;
2. The total time to drill the hole, including bit feed and retract times;
3. The drill time in each material (a, b, c, d) is set at 90% of the total drill time when the drilling thrust is less than the breakthrough thrust set on the first "teach" hole;
4. The maximum thrust and torque for each material (a, b, c, d) are also determined to set the dull bit thrust threshold and the dull bit torque threshold for each material (a, b, c, d), with the old values being overwritten;
5. The thrust transition parameters, representing the respective thrusts in the materials (a, b, c, d), are set to the maximum thrusts in the respective materials, with the old values being overwritten; and
6. The broken bit thrust threshold for each material (a, b, c, d) is set to the maximum thrust in the corresponding material, with the old value being overwritten.

After the second and final "teach" hole has been drilled, the following parameters are set:

1. Dull bit thrust threshold is set to 110% of the maximum thrust in each material (a, b, c, d) while drilling;
2. Dull bit torque threshold is set to 110% of the maximum torque in each material (a, b, c, d) while drilling;
3. Broken bit threshold is set to 50% of the maximum thrust in each material (a, b, c, d) while drilling; and
4. Thrust transitions are set to average the thrusts in succeeding materials as follows:

$$a = (a+b)/2$$

$$b = (b+c)/2$$

$$c = (c+d)/2$$

$$d = 0.9d$$

where a is the thrust transition in material a, b is the thrust transition in material b, c is the thrust transition in material c and d is the thrust transition in material d (the last material to be drilled).

In addition to the foregoing parameters, the elapsed time before the drill bit contacts the workpiece is also programmed. For example, if a relatively slow initial feed rate causes a five second delay before a substantial thrust is achieved, broken bit detection is not enabled until after the five second delay has elapsed.

Control computer 20 is preferably a computer of the MB3F-A386-25-OKA type, manufactured and sold by Addonics. Feed amp and computer 26 is preferably a computer of the BD55-203-0000/104A-2 type, manufactured and sold by Industrial Drives. Spindle amp and computer 28 is preferably a computer of the B055-210-00000/2102A-2 type, manufactured and sold by Industrial Drives. I/O Board 24 is preferably an I/O board of the PB-245M type, manufactured and sold by Gordos. Feed motor 12 is preferably a brushless DC motor of the B-102-A-32 type, manufactured and sold by Industrial Drives. Spindle motor 14 is preferably a DC brushless motor of the BR-2102-3046-A type, manufactured and sold by Industrial Drives.

In operation, control computer 20 is responsive to feedback signals from feed amp and computer 26 and spindle amp and computer 28 for determining whether drill bit 16 is in a peck cycle. Feed amp and computer 26 is programmed to control feed motor 12 to run a feed motion routine, which consists of a sequence of feed rates at selected depths in workpiece 18. Feed amp and computer 26 uses its own feed motion routine and pulses depth transition relay 32a to signal control computer 20 when a new feed rate is being implemented. Control computer 20 is responsive to the change in the feed rate for controlling spindle amp and computer 28 to change the speed of spindle motor 14 accordingly.

Alternatively, control computer 20 is programmable to control feed amp and computer 26 to switch to a new feed rate when thrust data indicates that a new material has been encountered. Control computer 20 signals feed amp and computer 26 by pulsing depth transition relay 32a via serial communication line 44. Control computer 20 simultaneously signals spindle amp and computer 28 to change the rotational speed of spindle motor 14.

As previously mentioned, during each peck cycle, the thrust and torque of bit 16 are substantially reduced by the temporary interruption of the feeding movement of bit 16. Other conditions, such as a broken drill bit or breakthrough condition, may also result in a rapid decrease in the thrust and torque of bit 16. Therefore, in order to distinguish these conditions from a normal peck cycle, control computer 20 must be able to differentiate between a normal peck cycle and one of the aforementioned conditions. The feed motion routine is preprogrammed into feed amp and computer 26, so that computer 26 is able to monitor when each peck cycle occurs. Full retract cycles, whereby bit 16 is fully retracted from the drill hole, may also be programmed into the feed motion routine. For example, the peck cycle may involve interrupting the feeding movement of bit 16 for 0.1 second every 0.01 inch of travel into workpiece 18. Further, a full retract cycle may be programmed for every tenth peck cycle (i.e., every 0.1 inch of travel) to clear chips from the drill hole.

A peck cycle is indicated when depth transition relay 32a is activated simultaneously with the activation of "done drilling" relay 36a. A signal indicating that bit 16 is in a peck cycle is transmitted by peck cycle relays 34a and 34b via I/O 24 to control computer 20. When control computer 20 receives a signal indicating that a peck cycle is in progress, computer 20 ignores the thrust and torque readings, so that computer 20 does not interpret the decreased thrust and torque readings associated with the peck cycle as another type of condition, such as a broken bit or breakthrough condition.

Figure 2:
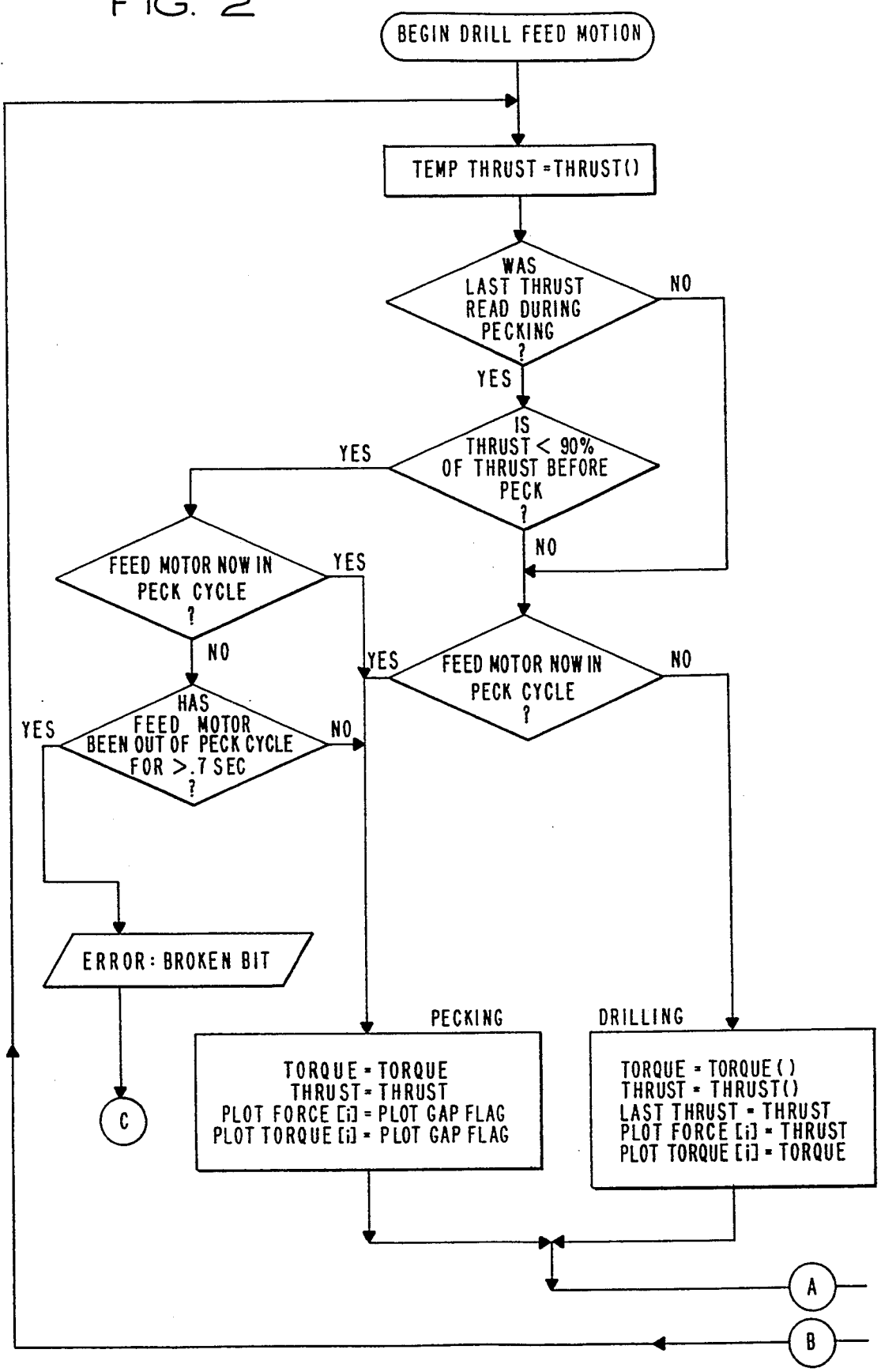
FIGS. 2 and 3 are computer flow diagrams illustrating the sequence of operation of the peck drilling control algorithm.
Figure 3:
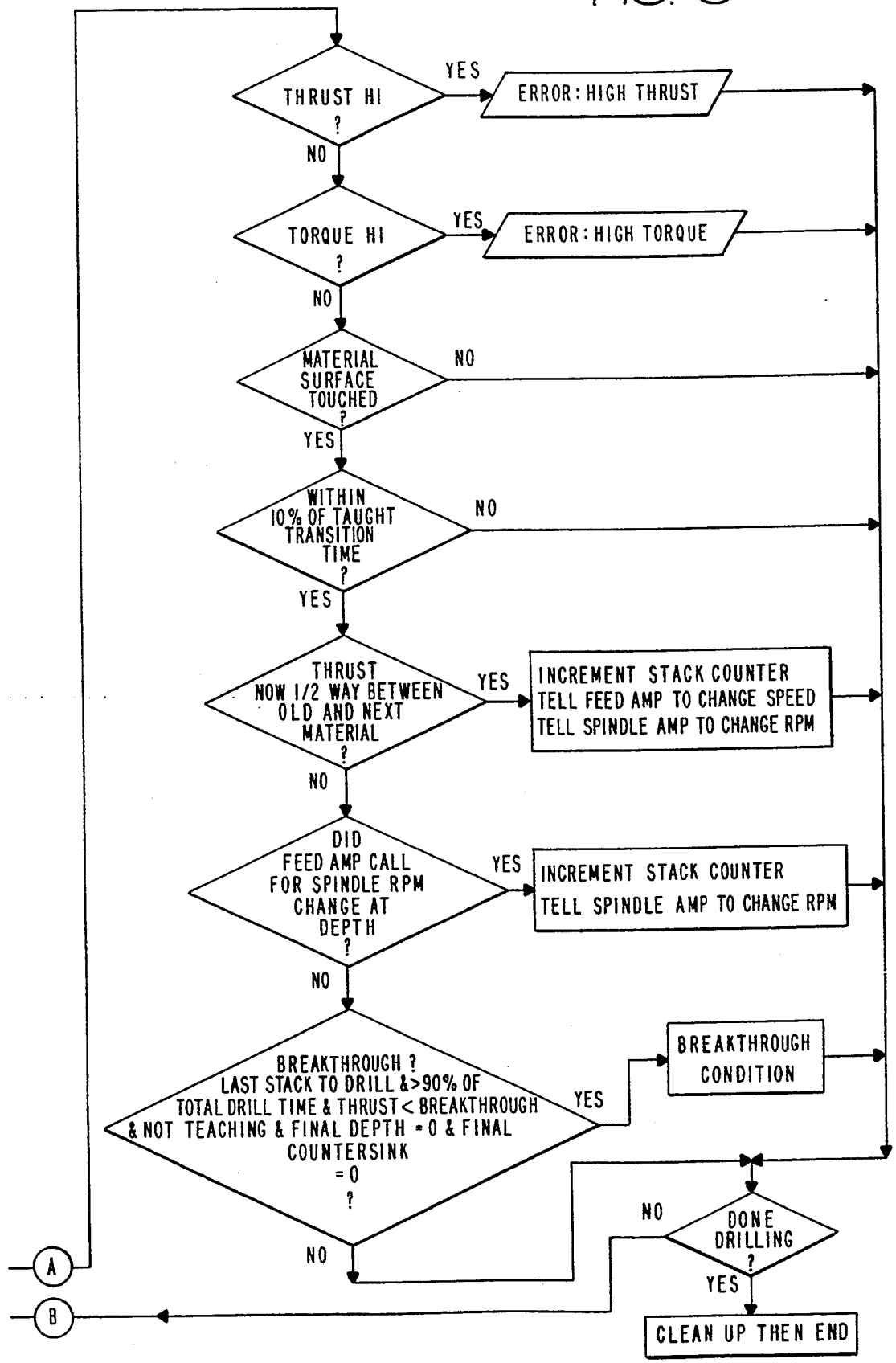

Referring also to FIGS. 2 and 3, the drilling control algorithm is depicted. Control computer 20 continually monitors the thrust and torque of bit 16. "Thrust( )" and "torque( )" represent the then current thrust and torque, respectively, of bit 16. Computer 20 compares thrust( ) with the immediately previous thrust reading (i.e., last thrust). If the last thrust reading occurred during a peck cycle, computer 20 ignores the last thrust reading and compares thrust( ) with the thrust reading immediately prior to the peck cycle. If the last thrust reading did not occur during a peck cycle, control computer 20 determines whether feed motor 12 is currently in a peck cycle. If it is not, computer 20 determines that bit 16 is in a normal drilling mode and uses the thrust( ) and torque( ) readings to detect the presence of various drilling conditions, such as a dull bit condition, a transition between different materials or a breakthrough condition. Thrust ( ) and torque( ) are plotted as the then current readings of thrust and torque. If feed motor 12 is in a peck cycle, computer 20 ignores thrust( ) and torque( ) and generates a software flag indicating that a peck cycle is in progress.

If the last thrust reading occurred during a peck cycle, computer 20 compares thrust( ) with the last thrust reading immediately prior to the peck cycle. If thrust( ) is 90% or more of the last thrust reading immediately prior to the peck cycle, computer 20 determines whether feed motor 12 is currently in a peck cycle. If it is not, computer 20 determines that bit 16 is in a normal drilling mode and will use the thrust( ) and torque( ) readings to determine various drilling conditions, as previously described. Thrust( ) and torque( ) are plotted. If it is determined that feed motor 12 is in a peck cycle, computer 20 ignores thrust( ) and torque( ) and generates a software flag indicating that a peck cycle is in progress.

If thrust( ) is less than 90% of the last thrust reading before the peck cycle and it is determined that feed motor 12 is not in a peck cycle, computer 20 determines whether feed motor 12 has been in a peck cycle within the last 0.7 second. If not, computer 20 assumes that the peck cycle is still in progress. If the feed motor has been out of a peck cycle for greater than 0.7 second, computer 20 interprets the abnormally low thrust reading as indicative of a broken bit condition. An error signal is generated indicating a broken bit condition.

If a broken bit condition is not indicated, the drilling control algorithm continues, as depicted in FIG. 3. If either thrust( ) or torque( ) exceeds the corresponding maximum threshold, a dull bit condition is indicated and an error signal indicative thereof is generated. If a dull bit condition is not indicated, thrust( ) is used to determined whether the drill bit has encountered a transition between different materials. First, it is determined whether bit 16 is in contact with workpiece 18. If the elapsed drill time in the previous ("old") material is within 10% of the programmed ("taught") transition time and if thrust( ) is halfway between the programmed thrust transition thresholds of the previous ("old") and current ("next") materials, control computer 20 increments a stack counter and signals feed amp and computer 26 to change the feed rate of feed motor 12 to the feed rate programmed for the next material in sequence. Control computer 20 also signals spindle amp and computer 28 to change the rotational speed of spindle motor 14.

Even if a transition between materials is not indicated, feed amp and computer 26 may call for a change in the rotational speed of the spindle motor 14, pursuant to the feed motion routine programmed in feed amp and computer 26. If so, control computer 20 increments the stack counter and signals spindle amp and computer 28 to change the rotational speed of spindle motor 14.

A breakthrough condition is indicated when drill bit 16 is in the last material (d) to be drilled, elapsed drill time is greater than 90% of the pre-programmed total drill time, thrust ( ) is less than the programmed breakthrough thrust threshold, the drill bit is not in a "teaching" mode and the final depth and final countersink readings are zero. Upon breakthrough, drill bit 16 is retracted from the hole and feed amp and computer 26 transmits a "done drilling" signal to control computer 20 indicating that the drilling operation has been completed. If the "done drilling" signal is not transmitted, the control algorithm will branch back to the beginning of the drill feed motion routine, as depicted in FIG. 2. The above-described control algorithm continues iteratively until "done drilling" relay 36 indicates that the drilling operation has been completed and bit 16 fully retracted from workpiece 18. Thrust and torque readings are plotted in response to an input command entered by an operator via keyboard 22.

In accordance with the present invention, improved apparatus and method are provided for controlling peck drilling using a drilling tool with a rotatable bit. Although the preferred embodiment of the invention has been described with reference to a drilling tool mountable with the end of a robot arm, the present invention is not limited to robotic drilling, but can be used in connection with any drilling tool or system for enhanced control of peck drilling operations. By detecting when the drill bit feed motor is in a peck cycle, the control apparatus is able to distinguish between a normal peck cycle and other drilling conditions, such as dull or broken drill bits, transitions between different materials in a workpiece and a breakthrough condition indicating that the drill bit has penetrated completely through the workpiece. The control apparatus provides precise control of peck drilling operations, to allow a variety of sophisticated peck drilling operations to be performed.

The preferred embodiment of the invention has now been described in detail. Since it is obvious that many changes in and additions to the above-described preferred embodiment may be made without departing from the nature, spirit and scope of the invention, the invention is not to be limited to the disclosed details, except as set forth in the appended claims.

What is claimed is:

1. Apparatus for controlling peck drilling using a drill with a rotatable bit, said apparatus comprising:
   first motive means for feeding the bit into a workpiece;
   second motive means for rotating the bit;
   control means for controlling said first motive means to feed the bit at a predetermined feed rate and said second motive means to rotate the bit at a predetermined rotational rate in accordance with a predetermined set of control parameters;
   first monitoring means for monitoring thrust applied to the bit and for generating a first electrical signal indicative thereof;
   second monitoring means for monitoring torque applied to the bit and for generating a second electrical signal indicative thereof;
   said control means being operable to ignore said first and second electrical signals when the bit is in a peck cycle, wherein feeding movement of the bit is temporarily interrupted, said control means being responsive to either or both of said first and second electrical signals when the bit is not in a peck cycle for detecting a predetermined condition.

2. Apparatus of claim 1 wherein said predetermined condition is a broken bit condition indicating a broken drill bit.

3. Apparatus of claim 2 wherein said broken bit condition is indicated by said thrust being less than a predetermined reference thrust and by the bit not having been in a peck cycle within a predetermined period of time.

4. Apparatus of claim 1 wherein said predetermined condition is a breakthrough condition indicating that the bit has penetrated completely through the workpiece.

5. Apparatus of claim 1 wherein said predetermined condition is a dull bit condition indicated by said thrust exceeding a predetermined thrust threshold and said torque exceeding a predetermined torque threshold.

6. Apparatus of claim 1 wherein said predetermined condition is a transition condition indicating that the bit has encountered a transition between discrete materials in the workpiece.

7. Apparatus of claim 1 further including input means for inputting said predetermined set of said control parameters into said control means.

8. Apparatus of claim 1 further including third monitoring means for determining when the bit is in a peck cycle.

9. A method of controlling peck drilling using a drill with a rotatable bit, said method comprising the steps of:
   feeding the bit into a workpiece at a predetermined feed rate in accordance with a predetermined set of control parameters;
   rotating the bit at a predetermined rotational rate in accordance with said predetermined set of control parameters as the bit is fed into the workpiece;
   monitoring thrust applied to the bit and generating a first electrical signal indicative thereof;
   monitoring torque applied to the bit and generating a second electrical signal indicative thereof;
   determining whether the bit is in a peck cycle, wherein feeding movement of the bit is temporarily interrupted, and ignoring said first and second electrical signals when the bit is in a peck cycle; and
   using either or both of said first and second electrical signals when the bit is not in a peck cycle to detect a predetermined condition.

10. The method of claim 9 further including the step of selecting said predetermined set of control parameters.

11. The method of claim 9 wherein said predetermined condition is a broken bit condition indicating a broken drill bit, said detecting including determining whether said thrust is less than a predetermined reference thrust and whether the bit has been in a peck cycle within a predetermined period of time, said broken bit condition being indicated by said thrust being less than said predetermined reference thrust and by the bit not having been in a peck cycle within said predetermined period of time.

12. Apparatus for controlling peck drilling using a drill with a rotatable bit, said apparatus comprising:

first motive means for feeding the bit into a workpiece;

second motive means for rotating the bit;

control means for controlling said first motive means to feed the bit at a predetermined feed rate and said second motive means to rotate the bit at a predetermined rotational rate in accordance with a predetermined set of control parameters;

monitoring means for monitoring selected drill parameters;

said control means being operable to ignore said selected drill parameters when the bit is in a peck cycle, wherein feeding movement of the bit is temporarily interrupted, said control means being responsive to said selected drill parameters when the bit is not in a peck cycle for detecting a predetermined condition.

13. Apparatus of claim 12 further including means for determining when the bit is in a peck cycle and for generating an electrical signal indicative thereof, said control means being responsive to said electrical signal.

* * * * *